United States Patent Office 3,251,851
Patented May 17, 1966

3,251,851
CERTAIN 7-(1-V-TRIAZOLYL)-3-ARYL
COUMARIN COMPOUNDS
Carl-Wolfgang Schellhammer and Roderich Raue, Leverkusen, and Heinrich Gold, Cologne-Stammheim, Germany, assignors to Farbenfabriken Bayer Aktiengesellschaft, Leverkusen, Germany, a German corporation
No Drawing. Filed Apr. 7, 1964, Ser. No. 358,118
Claims priority, application Germany, Apr. 11, 1963,
F 39,466
6 Claims. (Cl. 260—308)

The present invention relates to coumarin compounds; more particularly it concerns 7-(1-v-triazolyl)-3-aryl-coumarin compounds of the general formula

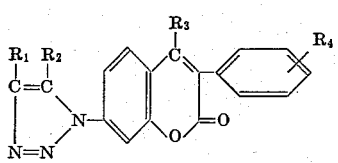

wherein $R_1$ and $R_2$ mean, independently of each other, hydrogen, lower alkyl radicals such as methyl or ethyl, aralkyl radicals, aryl radicals, alkoxymethyl such as methoxymethyl, chloromethyl, carboxyl or carbalkoxy groups, whilst $R_3$ stands for hydrogen or a lower alkyl radical, such as methyl or ethyl, and $R_4$ for hydrogen, a lower alkyl radical such as methyl or ethyl, a lower alkoxy group such as methoxy or ethoxy, or halogen, or quaternisation products thereof.

The coumarin compounds of the above formula can be obtained by various methods, for example by condensing 4-(1-v-triazolyl)-2-alkoxybenzaldehyde, such as, for example, 4-(1-v-triazolyl)-2-methoxy- or -2-ethoxy-benzaldehyde, with aryl-acetonitriles, for example with phenylacetonitrile or p-tolylacetonitrile, and cyclising, after the alkoxy group has been split, to give the corresponding 7-(1-v-triazolyl)-3-arylcoumarins. The quaternisation products can be prepared therefrom in the usual manner, for example by reaction with dimethyl sulphate or with p-toluene-sulphonic acid methyl ester.

The coumarin compounds of the present invention are suited for the brightening of natural or artificial fibre materials, foils, films or masses of wool, cellulose, cellulose esters, polyamides, polyurethanes, polyacrylonitrile and polyesters. Especially suitable brightening agents are the coumarin compounds corresponding to the above formula if $R_3$ is a hydrogen atom. The quarternisation products of the coumarin compounds are particularly suited for the brightening of materials of polyacrylonitrile or cellulose esters.

The coumarin compounds of the present invention can be used as optical brightening agents in the customary manner, for example in the form of solutions in water or in organic solvents, or in the form of aqueous dispersions for which, inter alia, condensation products of naphthalenesulphonic acids and formaldehyde can be applied as dispersing agents. Polyester materials can also be treated with the coumarin compounds in such a manner that they are impregnated with solutions or dispersions of the compounds, then squeezed off, dried and heated for a short time to temperatures above 100° C. The coumarin compounds can also be used together with detergents. They may, moreover, be added to spinning and film masses which serve for the production of synthetic fibres, filaments, foils and other shaped articles.

The coumarin compounds according to the invention give very good brightening effects, they are, moreover, very stable to light and also stable to chlorite-containing bleaching baths. The hitherto known optical brightening agents of the coumarin series do not possess these advantageous properties to the same extent.

The following examples serve to illustrate the invention without, however, limiting its scope.

*Example 1*

A solution of 101 g. of 4-(1-v-triazolyl)-2-methoxy-benzaldehyde and 66 g. of p-toluylacetonitrile in 500 cc. of ethanol is treated dropwise with 35 cc. of a 50% potassium hydroxide solution. The mixture is heated at 45-48° C. for 45 minutes and then cooled. The precipitated reaction product is filtered off and washed with water and alcohol. The resulting 133 g. of 4-(1-v-triazolyl)-2-methoxy-4′-methyl-α-cyano-stilbene of melting point 210-212° C. is suspended in 1 litre of benzene, the suspension is treated with 310 g. of aluminum chloride and heated for 6 hours at boiling temperature with stirring and cooling under reflux. The reaction mixture is then added to a mixture of 3 litres of ice-water and 300 cc. of concentrated hydrochloric acid. The benzene is distilled off with steam, the residue cooled and the precipitated crystalline components are filtered off with suction, washed with water and subsequently dried at 110° C. The 7-(1-v-triazolyl)-3-p-tolyl-coumarin, obtained in a yield of 127 g., has a melting point of 255° C.

Polyester fibres produced from terephthalic acid and glycol are treated at a goods-to-liquor ratio of 1:40 in a bath which contains per litre 1 g. of oleyl alcohol sulphonate, 0.75 g. of formic acid and 0.07 g. of 7-(1-v-triazolyl)-3-p-tolyl-coumarin described above. The bath is subsequently heated to the boil and maintained at this temperature for 30-60 minutes. After rinsing and drying, the polyester fibres show a neutral-white brightening.

Instead of 7-(1-v-triazolyl)-3-p-tolyl-coumarin, it is also possible to use 7-(1-v-triazolyl)-3-phenyl-coumarin which is obtainable in an analogous manner and has a melting point of 243-246° C.

*Example 2*

4 g. of 7-(1-v-triazolyl)-3-p-tolyl-coumarin obtained according to the instructions of Example 1, are treated in 120 cc. of chlorobenzene at boiling temperature with 4 g. of dimethyl sulphate. After 4 hours, the reaction mixture is cooled, the quaternisation product formed is filtered off with suction and recrystallised from water. The crystals, obtained in a yield of 4.6 g., show a melting point of 252-253° C.

Polyacrylonitrile fibers are introduced at a goods-to-liquor ratio of 1:40 into an aqueous bath which contains per litre 1 g. of oxalic acid, 1 g. of sodium chlorite, and 0.1 g. of the quaternisation product prepared from 7-(1-v-triazolyl)-3-p-tolyl-coumarin and dimethyl sulphate as described above. The bath is then heated to the boil in the course of 20 minutes and maintained at that temperature for 45-60 minutes. The polyacrylonitrile fibres are subsequently rinsed and dried. The fibres are excellently brightened.

It is also possible to use, instead of the above quaternisation product, the quaternisation product obtainable from 7-(1-v-triazolyl) - 3 - p - tolyl-coumarin by reaction with diethyl sulphate, of melting point 196-198° C., or the quaternisation product obtainable from 7-(1-v-triazolyl)-3-phenyl-coumarin by reaction with p-toluyl-sulphonic acid methyl ester, of melting point 260° C.

*Example 3*

A stock solution which was prepared from 10 parts by weight of polyacrylonitrile, 80 parts by weight of dimethyl formamide and 10 parts by weight of the quaternization product prepared from 7-(1-v-triazolyl)-3-p-tolyl-coumarin and dimethyl sulphate as described in Example 2, is added to a customary polyacrylonitrile spinning solution in such a quantity that the concentration of the quaternization product in the extruded polyacrylonitrile material amounts to 0.2 percent by weight. The spinning solution is extruded in the usual manner and the fibre material formed is then manipulated for 45 more minutes, at a goods-to-liquor ratio of 1:40, in an aqueous bath at 95° C. which contains per litre 1 g. of sodium chlorite and 1 g. of oxalic acid. The polyacrylonitrile fibres obtained have an excellent white appearance.

We claim:
1. A compound of the formula

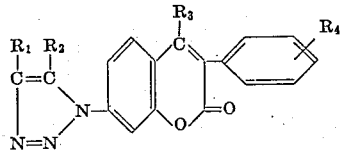

wherein $R_1$, $R_2$ and $R_3$ are members selected from the group consisting of hydrogen and lower alkyl; and $R_4$ is a member selected from the group consisting of hydrogen, lower alkyl, lower alkoxy and halo; and the corresponding quaternisation products with a member selected from the group consisting of dilower alkyl sulfate and p-tolyl sulfonic acid methyl ester.

2. 7-(1-v-triazolyl)-3-phenyl-coumarin.
3. 7-(1-v-triazolyl)-3-p-tolyl-coumarin.
4. The quaternisation product of 7-(1-v-triazolyl)-3-phenyl-coumarin with dilower alkyl sulfate.
5. The quaternisation product of 7-(1-v-triazolyl)-3-p-tolyl-coumarin with dilower alkyl sulfate.
6. The quaternisation product of 7-(1-v-triazolyl)-3-phenyl-coumarin with p-tolyl-sulphonic acid methyl ester.

References Cited by the Examiner
FOREIGN PATENTS
1,320,597    1/1963    France.

NICHOLAS S. RIZZO, *Primary Examiner.*
ALTON D. ROLLINS, *Assistant Examiner.*